March 15, 1960
E. BOBARD
2,928,487
DRIVEN STEERING WHEEL
Filed Nov. 18, 1955
3 Sheets-Sheet 1
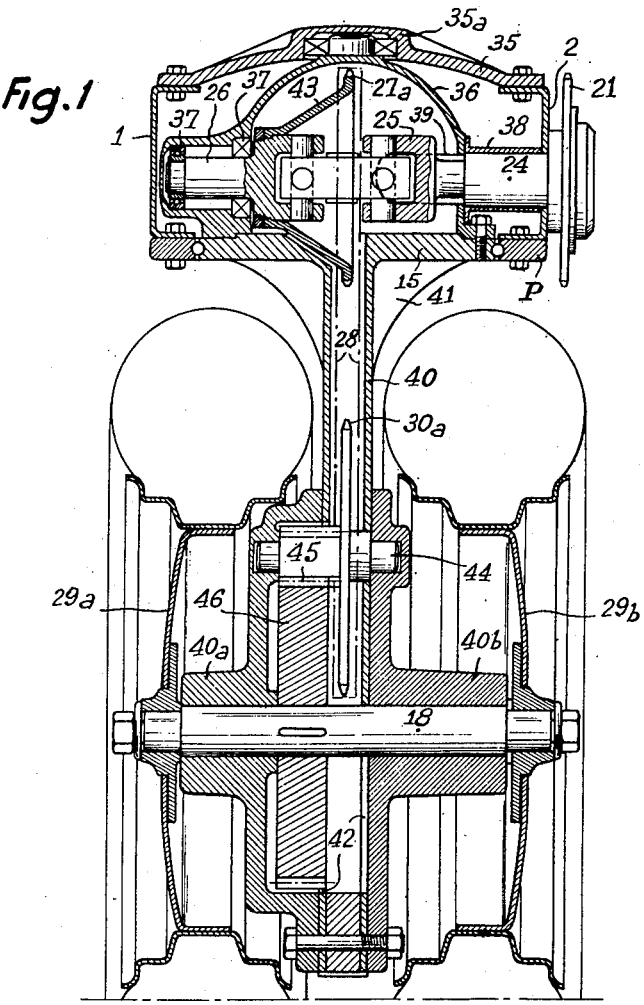
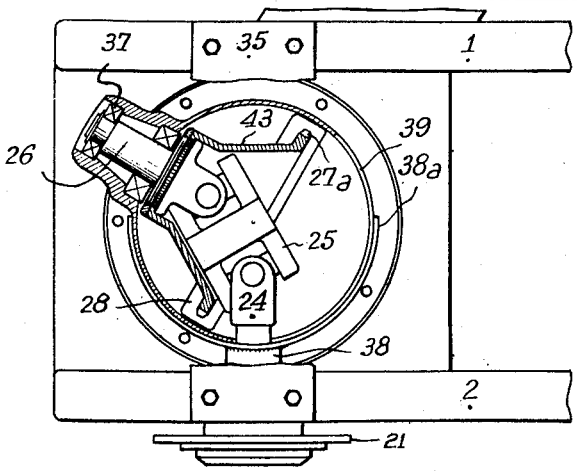
Inventor:—
Emile Bobard.
By: Howson and Howson,
Attorneys.

March 15, 1960  E. BOBARD  2,928,487
DRIVEN STEERING WHEEL
Filed Nov. 18, 1955  3 Sheets-Sheet 2
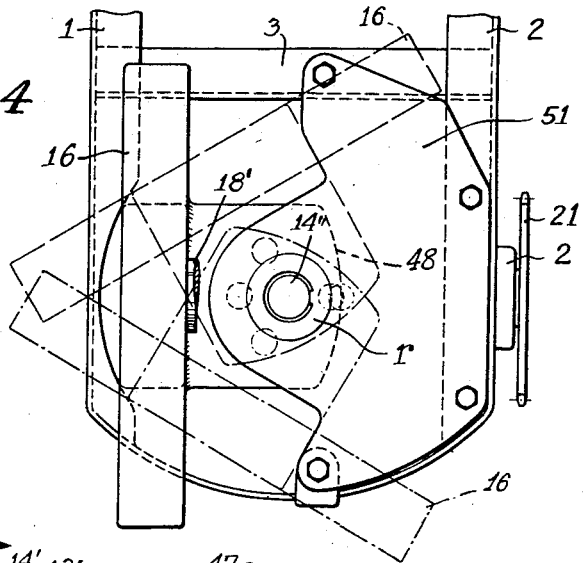
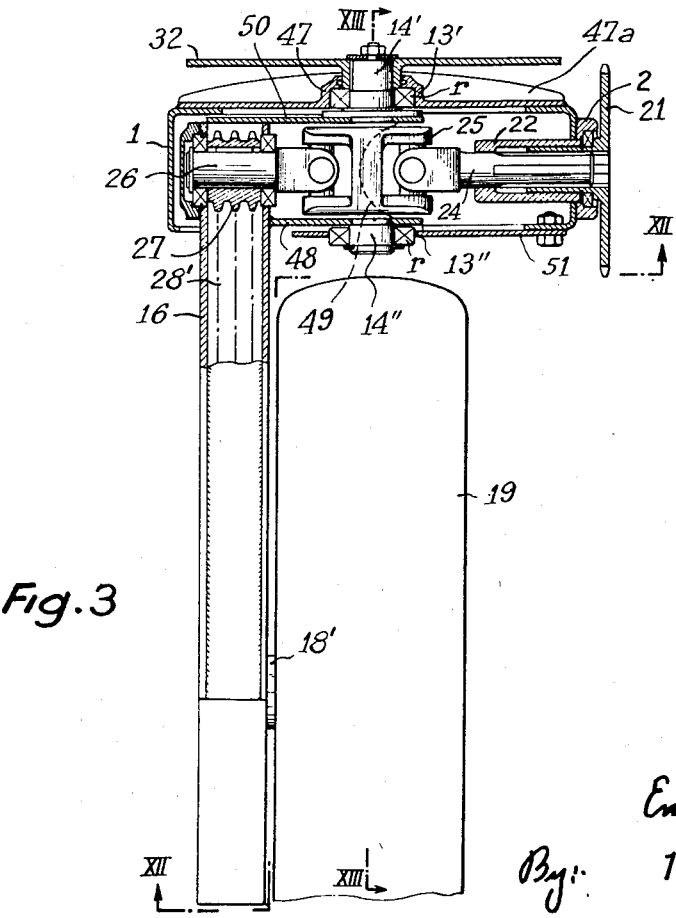

March 15, 1960 E. BOBARD 2,928,487
DRIVEN STEERING WHEEL
Filed Nov. 18, 1955 3 Sheets-Sheet 3
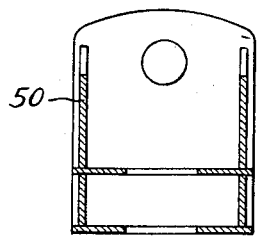
Fig.6
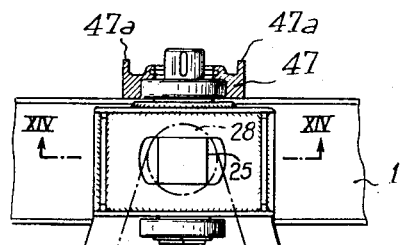
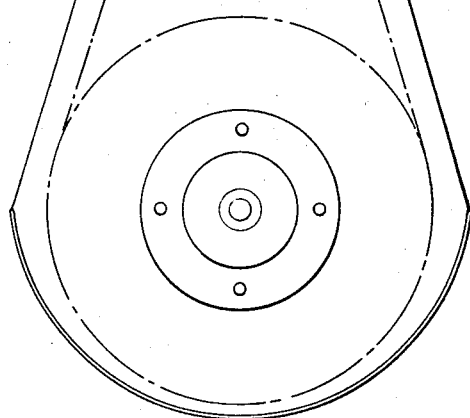
Fig.5
Inventor:-
Emile Bobard.
By:- Howson and Howson.
Attorneys.

United States Patent Office 2,928,487
Patented Mar. 15, 1960

2,928,487

DRIVEN STEERING WHEEL

Emile Bobard, Beaune, France

Application November 18, 1955, Serial No. 547,817

Claims priority, application France November 20, 1954

5 Claims. (Cl. 180—42)

This invention relates to supporting assemblies for the wheels of vehicles, in cases where the wheel is simultaneously drivable from the vehicle engine, and steerable from an appropriate steering control. It is usual in such cases to drive the wheel through an angular drive transmission such as a dual Cardan joint or the like, whereby the engine torque may be transmitted to the wheel axle regardless of the angular deflections that may be imparted to the wheel unit for steering purposes. However, the range of angular steering deflections obtained heretofore by the use of such means has generally been objectionably restricted.

It is an object of this invention to provide a supporting assembly for a drivable and steerable wheel unit of a vehicle, which will permit of imparting considerably higher steering deflections to the wheel unit than were obtainable heretofore without disturbing the transmission of the engine drive thereto. A specific object is to provide such an assembly which will allow the impartation of 90° steering deflection to a wheel unit in either sense from the straight-away condition thereof. It is also an object to provide an improved supporting assembly for a drivable and steerable wheel unit which will be reliable, rugged and relatively simple. Another object is to reduce the requisite vertical clearance space between the top of the wheel unit and the base of the vehicle frame or chassis, and thereby to reduce the elevation of the vehicle chassis above the ground. A further object is to reduce the engine torque that has to be transmitted through the Cardan-joint or other type of angular transmission, for a given engine output, and thereby to make it possible to utilize a smaller-size and more lightweight angular transmission for an engine of given rating.

A further object is to provide an improved supporting assembly for a drivable and steerable twin-wheel unit, whereby transverse spacing between the twin wheels of the unit may be kept comparatively low despite the presence of supporting structure therebetween. A more general object is to provide an improved wheel supporting means for an off-the-road vehicle of the type having one front wheel unit and one rear wheel unit, each of which units may comprise either a single wheel or twin wheels, and at least one of said wheel units being simultaneously drivable and steerable; such vehicles, generally provided with side stabilizer wheels of small size, are commonly used as tractors for farming and other off-the-road purposes, and is highly desirable that they be steerable with a minimum turning radius and preferably with a "zero" turning radius. i.e. by deflecting both the front and rear wheels thereof by 90° in opposite directions. It is among the objects of the invention to provide for this.

The above and further objects of the invention will appear as the disclosure proceeds.

In accordance with the chief aspect of the invention, a supporting assembly for a drivable and steerable wheel unit comprises a pivot member rotatable in the vehicle frame about a vertical axis, a supporting member secured to and depending from said pivot member and supporting said wheel unit for rotation in a position such that the medial vertical plane of said unit substantially extends through said vertical axis, an angular drive transmission having an input and an output shaft adapted for relative angling displacements, said input shaft being rotatably supported in said frame and being driven from a source of power, such as the vehicle engine, and said output shaft being rotatably supported in one of said members— i.e. the pivot member or the supporting member secured thereto—and being arranged to drive said wheel unit in rotation, steering means being further provided for rotating said pivot member about its vertical axis.

Throughout the specification and claims, the expression "angular transmission" should be understood as designating any type of drive transmission adapted to transmit a drive torque from an input shaft to an output shaft regardless of the angular relationship between said shafts within a predetermined range. A transmission comprising two interpivoted Cardan joints is one example of such an angular transmission, and will be specifically referred to in the ensuing disclosure for purposes of clarity.

The assembly of the invention makes it possible so to arrange the angular transmission that the axis about which the input and output shafts thereof are relatively displaceable, is a vertical axis aligned with the axis of rotation of the pivot member and the wheel unit suspended therefrom, and as a result of this the range of angular displacements of the pivot member and wheel unit about the vertical axis of rotation thereof will be determined only by the range of permissible angling between the input and output shafts of said angular transmission, provided of course matters are so arranged that there will be nothing to interfere mechanically with the rotation of the unit within said range. Because of this the invention can achieve 90° deflection of the wheel unit in either sense as already stated.

The invention will now be described in greater detail with reference to the accompanying drawings, which illustrate some exemplary embodiments thereof for purposes of explanation but not of limitation.

In the drawings:

Fig. 1 is a sectional view on a larger scale, relating to an embodiment of the invention as applied to a wheel unit comprising twin wheels;

Fig. 2 is an overhead sectional plan view of the assembly of Fig. 1, with the parts overlying the dual Cardan-joint removed;

Fig. 3 is a sectional elevation illustrating a further embodiment of the invention;

Fig. 4 is a horizontal view in section on the broken line XII—XII of Fig. 3;

Fig. 5 is a section on line XIII—XIII of Fig. 3;

Fig. 6 is a section on line XIV—XIV of Fig. 5.

Referring to the drawings, in general, the tractor may have a frame comprising longitudinal spaced channel-shaped side members 1 and 2 interconnected by cross members such as 3 (Fig. 4). A motor and gearing (not shown) may be mounted on the frame to drive the front and rear wheels.

To permit 90° deflection of the wheels, the frame of the vehicle is elevated with respect to the wheels to provide the necessary clearance space thereunder.

Now turning to the embodiment illustrated in Figs. 1 and 2, there is shown in detail a twin wheel construction according to one form of the invention. The frame side members 1 and 2 are interconnected by suitable cross members including an arcuate member 35 having its lateral ends secured to the upper flanges of the channel shaped side members 1 and 2. Formed in the midportion of the cross member 35 is a downwardly open recess or socket 35a adapted to receive a pivot projecting from the upper end of a domed casing 36 presently described, and to serve as a thrust bearing seat therefor.

Bolted to the bottom flanges of the channels 1 and 2 is a plate P formed with a wide circular aperture therein in which a disc member 15 is rotatably received through ball bearings as shown. Secured to the upper side of the member 15 is a domed casing 36 adapted to house a dual Cardan drive transmission therein, generally designated 25. The dual Cardan assembly includes an input shaft 24 projecting laterally from and journalled in one side of the casing 36 and frame member 2 and having secured on its extremity projecting beyond said member a drive gear 21 adapted to be rotated from the engine through any suitable transmission such as a chain drive. The input shaft 24 of the transmission is journalled in a bushing 38 fixedly secured to and projecting inwardly from the frame side member 2, and extends freely through an aperture 39 formed in the side wall of dome casing 36. As more celarly shown in Fig. 2, greater part of the area of the aperture 39 is adapted to be sealed at all times by means of an arcuate sealing member or segment 38a projecting from the bushing 38.

The dual Cardan assembly further includes an output shaft 26 which is journalled in spaced ball bearings 37 received in a blind recess or socket formed in the opposite side wall of domed casing 36. Thus it will be apparent that regardless of the steering deflections imparted to the wheel assembly and the consequent angular position assumed by the pivot assembly including disc member 15 and domed casing 36 about its vertical axis, the output Cardan shaft 26 will be able to accommodate such deflections.

Secured around the output section of the dual Cardan transmission is a frustoconical annular or bell-shaped member 43 which has its circular open end peripherally formed with sprocket teeth 27a in the vertical center plane of the wheel assembly. The pivot disc member 15 has a central aperture formed in it and a narrow casing section 40 of e.g. square cross section is formed integrally with the disc to project vertically downwardly from said central aperture therein. Stiffener flanges or ribs 41 are integrally cast with the disc 15 and casing section 40 to brace these elements in the root area of the casing section. Secured to the lower end portion 42 of the casing section 40 on opposite sides thereof are a pair of axle bearing casings 40a and 40b in which the wheel axle shaft 18 is journalled. A gear wheel 46 is splined to the axle shaft at a position slightly offset from the center thereof and meshes with a pinion 45 secured on a shaft 44 journalled in upward extensions of the casings 40a and 40b. Shaft 44 also carries a sprocket gear 30a secured thereon substantially in the vertical center plane of the assembly and connected by a drive chain 28 with the sprocket teeth 27a. Thus it will be clear that the rotation of the engine-powered input gear 21 will be transmitted to the wheel axle shaft 18 through the transmission just described, regardless of the angular deflection of the wheel assembly about the vertical axis of rotation of the steering pivot member 15. The bell-shaped member 43 is so conformed that it will not interfere with the operation of the Cardan assembly 25 for the largest deflection angles that can be imparted to the wheel assembly during steering.

The wheel drum members 29a and 29b are supported on the ends of shaft 18 beyond the extremities of bearing casings 40a and 40b and it will be observed that owing to the arrangement described, and particularly to the location of the gearing 30a—45—46 in the lowermost part of the casing section 40, i.e. generally between the wheel drums 29a and 29b, the transverse dimension of the twin wheel assembly may be reduced to a minimum and the rims and tires of the twin wheels are actually spaced only a very small distance apart. If desired, conventional differential mechanism may be interposed in the drive between the wheels, and means may further be provided for blocking or disabling said mechanism when required.

It may be noted in connection with this embodiment, that owing to the high reduction ratio obtained through the gearing 30a—45—46, the drive torque the Cardan assembly 25 will have to transmit will be low, so that a small-size Cardan transmission may be used. It will be understood that in order to permit the use of a high reduction drive transmission from the Cardan output shaft 26 to the wheel axle, the reduction ratio from the engine crankshaft to the Cardan input shaft should be reduced in a corresponding ratio, so as to obtain the desired over-all ratio.

Figs. 3 to 6 illustrate a further modification of the invention, designed in particular to permit large steering deflections while retaining a minimum elevation for the chassis above the ground. As shown, the side channel members 1 and 2 have their upper flanges interconnected by an upper cross member 47 secured thereto and having stiffener ribs or flanges 47a integrally provided thereon. The cross member 47 is formed with an upward boss 13' centrally thereof with a vertical aperture in it for receiving an upper pivot section 14' journalled therein in a ball bearing r. The projecting upper end of the pivot section 14' has a sprocket wheel 32 secured upon it for imparting steering rotation to the pivot. A thick-walled hollow casing 48 has an upper horizontal wall 50 secured to the lower projecting end of the upper pivot section 14' and extends substantially to one side only of the pivot. On the other side the casing 48 has an open end as indicated at 49 to accommodate the dual Cardan transmission presently described. Casing 48 has a lower horizontal wall spaced below the upper wall and having secured to it a lower pivot section 14" aligned with the upper pivot section 14'. The lower pivot section 14" is rotatably received through a lower ball bearing r in an aperture 13" formed in a plate member 51 which is secured on one side thereof to the lower flange of the side member 2. The plate 51 is cut out to a configuration as shown in full lines in Fig. 4 to permit an extensive range of angular displacements of the pivot and wheel assembly as will presently appear. Depending from the end of the casing 48 remote from the pivot axis is a vertical casing 16, which at its lower end supports the wheel axle 18' journalled therein and supporting the wheel 19. The dual Cardan transmission 25 has an input shaft 24 extending through a sleeve 22 secured in the web of side member 2 and having splined on the outer extremity thereof a sprocket gear 21 journalled in a suitable bearing and drivably connected with the engine output shaft. The pivotal axis of the dual Cardan is aligned with the common vertical axis of the pivot members 14' and 14". The output shaft 26 of the Cardan is journalled in suitable spaced bearings provided in the casing assembly comprising the horizontal casing 48 and vertical casing 16, as shown. Secured on Cardan output shaft 26 between the spaced bearings thereof is a sprocket pinion 27, herein shown as a triple pinion, adapted to be connected by a triple chain drive 28' with a sprocket gear, not shown, suitably mounted in the casing 16 for driving the axle shaft 18'. It will be seen that with this arrangement rotation of the input gear 21 will rotate the wheel axle 18 regardless of the angular position imparted to the pivot and wheel assembly, and that a wide range of angular displacements are impartable to said assembly to either side of its centered position owing to the configuration of the supporting plate 51, which is such that the reduced upper portion of the casing 16 will only be arrested by abutment of an end thereof against a portion of the plate 51, after the pivot assembly has been deflected a substantial angle, herein about 60°, one way or the other from its centered position. In Fig. 4 in which the left side is a view looking upwards from the bottom end of the casing 16 with the wheel removed, the casing 16 is illustrated in full lines in its centered position and in chain lines in each of its fully deflected positions.

It will be understood that the frame side members 1 and 2 have their bottom flanges interconnected by solid cross members, not shown, at suitable points along their longitudinal extent.

It will be understood that various modifications may be made in the exemplary embodiments illustrated and described herein without departing from the scope of the invention. Thus, certain features specifically shown herein as applied to one embodiment, may where suitable be incorporated in a different one of the illustrated embodiments, as will be apparent to anyone familiar with the art.

What I claim is:

1. In a vehicle of the type described having a frame and at least one drivable and steerable wheel unit, side members in said frame, a cross member having ends secured to the tops of said side members, a plate member secured to the bottom end of one side member and extending part way toward the other side member, a casing having an upper and a lower wall between said cross member and said plate member and between said side members of the frame, an upper pivotal connection between said housing and said cross member and a lower pivotal connection between said housing and said plate member, both said pivots being rotatable about a common vertical axis substantially in the medial vertical plane of said frame, said casing extending from said pivots towards the frame side member opposite that side member to which said plate member is secured, a support secured to said casing and depending therefrom adjacent said opposite side member, means supporting said wheel for rotation in said support substantially in a plane containing said pivot axis, an angular drive transmission including an input and an output shaft adapted for relative angular displacements and extending across said frame above said plate member, means rotatably supporting said input shaft in said one side member, said angular transmission projecting into said casing, means rotatably supporting said output shaft in said end of the casing, power drive means on the vehicle for rotating said input shaft, drive means in said support for rotating said wheel unit from said output shaft, and steering means for rotating said casing about said vertical axis.

2. In a motor vehicle, a motor driven steerable wheel unit comprising at least one wheel, a wheel support, a housing integral with said wheel support located above said wheel, a frame above said wheel extending above and below said housing, means pivotally supporting said housing from said frame about a substantially vertical axis comprising pivotal connections for said housing in said frame above the housing and in the lower portion of the frame permitting rotation of the housing relative to said frame for steering said vehicle, in combination with Cardan joint means which includes a motor driven input shaft turning in said frame and an output shaft turning in said housing, and a Cardan joint connecting said shafts and lying in said vertical axis and being between the pivotal connections of the housing with the frame, and a driving connection between said output shaft and said wheel, said driving connection being offset, throughout, from the plane of rotation of said wheel and being in a plane parallel to said last mentioned plane.

3. The combination set forth in claim 2 in which said vertical axis lies in the plane of the wheel.

4. The combination as set forth in claim 2 in which the wheel support is spaced from said vertical axis, and the frame includes a plate carrying the lower of said pivotal connections, said plate being cut away to permit said wheel support to move as said wheel unit is steered.

5. The combination as set forth in claim 2 in which the steering means includes a rotary member turnable with said upper pivotal connection of the housing with the frame as the vehicle is steered.

References Cited in the file of this patent

UNITED STATES PATENTS

| | | |
|---|---|---|
| 645,272 | Scheu | Mar. 13, 1900 |
| 949,828 | Lassen | Feb. 22, 1910 |
| 1,142,066 | Sutherland | June 8, 1915 |
| 1,242,500 | Wilcox | Oct. 9, 1917 |
| 1,293,971 | Stimson | Feb. 11, 1919 |
| 1,606,706 | Johnston et al. | Nov. 9, 1926 |

FOREIGN PATENTS

| | | |
|---|---|---|
| 712,776 | Germany | Oct. 31, 1941 |